(12) United States Patent
Furumoto

(10) Patent No.: US 6,398,914 B1
(45) Date of Patent: Jun. 4, 2002

(54) METHOD AND DEVICE FOR PROCESS CONTROL IN CELLULOSE AND PAPER MANUFACTURE

(75) Inventor: Herbert Furumoto, Erlangen (DE)

(73) Assignee: Siemens Aktiengesellschaft (DE)

(*) Notice: Subject to any disclaimer, the term of this patent is extended or adjusted under 35 U.S.C. 154(b) by 0 days.

(21) Appl. No.: 08/913,804
(22) PCT Filed: Mar. 19, 1996
(86) PCT No.: PCT/DE96/00477
§ 371 Date: Dec. 18, 1997
(87) PCT Pub. No.: WO96/29465
PCT Pub. Date: Sep. 26, 1996

(30) Foreign Application Priority Data

Mar. 23, 1995 (DE) .......................... 195 10 008

(51) Int. Cl.$^7$ .............................. D21C 7/12; D21C 3/22; D21B 1/04; G05B 13/02
(52) U.S. Cl. .................... 162/198; 162/49; 162/263; 162/254; 162/61; 700/128; 241/28; 356/326; 356/328; 356/402; 356/411
(58) Field of Search ..................... 162/49, 263, 198, 162/254, 238, 232, 61, 252; 356/326, 328, 402–411; 250/226, 339.01, 339.06; 364/471.01; 241/28, 33

(56) References Cited

U.S. PATENT DOCUMENTS

| | | | |
|---|---|---|---|
| 3,794,843 A | * 2/1974 | Chen | 250/359.1 |
| 3,802,964 A | * 4/1974 | Forgacs et al. | 162/263 |
| 4,171,916 A | * 10/1979 | Simms et al. | 356/366 |
| 4,276,119 A | * 6/1981 | Karnis et al. | 162/49 |
| 4,514,257 A | * 4/1985 | Karlsson et al. | 162/49 |
| 4,692,210 A | * 9/1987 | Forrester | 162/49 |
| 4,886,576 A | 12/1989 | Sloan | 162/49 |
| 5,486,915 A | * 1/1996 | Jeffers et al. | 356/318 |
| 5,491,340 A | * 2/1996 | Saarinen | 250/339.06 |

FOREIGN PATENT DOCUMENTS

| | | |
|---|---|---|
| DE | 34 18 267 | 11/1985 |
| EP | 0 445 321 | 9/1991 |
| EP | 0 590 433 | 4/1994 |
| SU | 798215 | 1/1981 |
| WO | 94/20671 | 9/1994 |
| WO | 95/08019 | 3/1995 |

OTHER PUBLICATIONS

Bocherbau et al. "method for prediction by combining data analysis and neural networks: Application to prediction of Apple quality using near Infra–Red Spectra," Aug. 1992, pp 207–216.*
Borgaard et al. "Optimal minimal neural interpretation of spectra," Jan. 1992, pp 544–551.*
Edlund, S. et al., "Experiences from the STFI Opti–Kappa and its use for the control of pulping processes," pp. 118–122.
Wallbäcks, L. et al., "Multivariate Data Analysis of In Situ Pulp Kinetics Using $^{13}$C CP/MAS NMR.," Journal of Wood Chemistry and Technology, vol. 2 (1989), pp. 235–249.
Anacon Model 106 Process Moisture Analyzer, "The proven infrared analysis technique for continuous on–line determination in solid materials,", pp. 1–6.

* cited by examiner

Primary Examiner—José S. Fortuna
(74) Attorney, Agent, or Firm—Kenyon & Kenyon

(57) ABSTRACT

In the production of de-inked pulp, measuring devices are used to register spectral and/or physical characteristic values of a starting material. These values are then fed to a neural network, by means of which correction variables are obtained for a regulating or controlling device which in provided. According to the invention, the measuring device is used to evaluate at least the starting materials of the production of pulp and/or paper. The evaluation of the characteristics of the raw material used in the production of pulp and paper is thereby possible.

22 Claims, 5 Drawing Sheets

METHOD AND DEVICE FOR PROCESS CONTROL IN CELLULOSE AND PAPER MANUFACTURE

FIELD OF THE INVENTION

The invention relates to a method and a device for process management in the production of pulp and/or paper, using at least one measuring device for registering spectral characteristic values at different wavelengths and at least one regulating or controlling device for the operating means used in the production of pulp and/or paper.

BACKGROUND OF THE INVENTION

EP 0 445 321 A1 discloses a method for the production of pulp in a continuous digester. In the process, a desired pulp quality is prescribed with the aid of a so-called quality measure (Q). Using a process model, the digestion temperature (T*) belonging to the prescribed value of the quality measure (Q*) is prescribed as a main controlled variable. In this arrangement, the process model may be adapted to accommodate changed operating conditions of the pulp digester. For this purpose, it is important that the supplying of wood chips is included as a process variable in the process model, by means of physical characteristic values.

WO 94/20671 A1 describes a method for regulating the production process of cellulose in which the mass density of the wood chips fed as raw material for the process is taken into account and is envisaged to be variable. Corresponding samples of the mass density of wood chips fed into the process are taken into account in a computing unit and are designed to be as a function of the computational results.

Finally, EP 0 590 433 A2 describes a control method for the production of pulp by means of pressure and temperature control, in which the production process is subdivided into two phases. The first phase of the digestion includes the heating up of the suspension of groundwood and digester liquid which is subjected to as high a pressure as possible. The pressure is lowered in the second phase of the digestion which occurs at the final digestion temperature.

In the earlier international Patent Application WO 95/08019 A, which is not a prior publication, a device is proposed for operating an installation specifically for the production of so-called de-inked pulp. The device contains at least one waste paper preparation means which has a dewatering machine or at least a paper machine connected downstream thereof. In this arrangement, a measuring device for registering spectral and/or physical characteristic values of the waste paper suspension, which is fed to the waste paper preparation means or passes through the latter, is already used. Furthermore, regulating or control devices for the operating means of the waste paper preparation means is used there and at least one state analyzer for the waste paper suspension is proposed. The state analyzer is implemented in the form of one or more parallel neural networks. Using the characteristic values of the measuring device, the state analyzer outputs controlled variables for process management to the regulating or controlling devices of the operating means for the waste paper preparation means.

When the above-described device is used, in particular, for the production of de-inked stock, using as large a proportion as possible of waste paper, a problem particularly taken into account is that the quality of the waste paper introduced into the installation fluctuates severely. For example, depending on the respective mixture of the waste paper, it is possible for widely varying proportions of different types of waste papers to be present, for example, colored, illustrated papers, grey newsprint, white papers, contaminated papers, old books, for example including telephone directories, cartons, packages, coated papers and further contaminations of all types. The device previously described in the earlier patent application solves the problems in a satisfactory manner specifically for the production of de-inked pulp.

Furthermore, U.S. Pat. No. 4,886,576 describes an installation for use in the production of paper. Separate units of primary and secondary refiners for beating digest chips are connected downstream of one or more digesters for the production of pulp from chips. In this case, UV absorption measurements are carried out on the digester liquid, or the so-called pulp. Control or regulation signals are derived from the measured values, on one hand for the temperature management of the digester, and on the other hand for the primary refiner stage. It is important in this case to carry out the UV absorption measurements on the digester liquid with a non-solid consistency, in particular on a pulp, since the UV spectrum thereof is influenced by the constituents dissolved out of the wood.

OBJECTS AND SUMMARY OF THE INVENTION

An object of the present invention is to apply the measurement principle of the sort used in the prior art to the production of pulp and/or paper so that it is suitable for feedforward control.

The object is achieved according to the present invention in that, using a measuring device, the spectral characteristic values of at least the starting materials in the production of pulp and/or paper are registered. The starting materials (i.e., either the raw material "wood" or the secondary raw material "waste paper") continuously pass by the measuring device, which registers the starting materials' spectral characteristic values.

Within the scope of the invention, neural networks are used in a manner known in the art as state analyzers for evaluating the spectral characteristic values. In particular, it is advantageously possible therewith to derive from the age of the wood and/or from the proportion of respective wood species such controlled variables as are important for the lignin content of the wood. Signals derived in such a way can be used, for example, for controlling the digester, which is necessary for the production of pulp and/or paper.

The associated device for carrying out the method contains at least one measuring device for registering spectral characteristic values and at least one regulating or controlling device for the operating means used. The measuring device may be a spectrometer for registering intensity measured values at different wave-lengths. By suitable evaluation of the measured values, correction variables for the regulating or controlling device may be derived. There can be additional measuring devices in the production line, so that in the same way characteristic values of the intermediate and/or final products can be registered, from which signal variables can be fed back to the controlling or regulating device.

BRIEF DESCRIPTION OF THE DRAWINGS

Further details and advantages of the invention emerge from the description of figures relating to exemplary embodiments, with reference to the drawing, wherein.

DETAILED DESCRIPTION OF THE INVENTION

Figure 1:
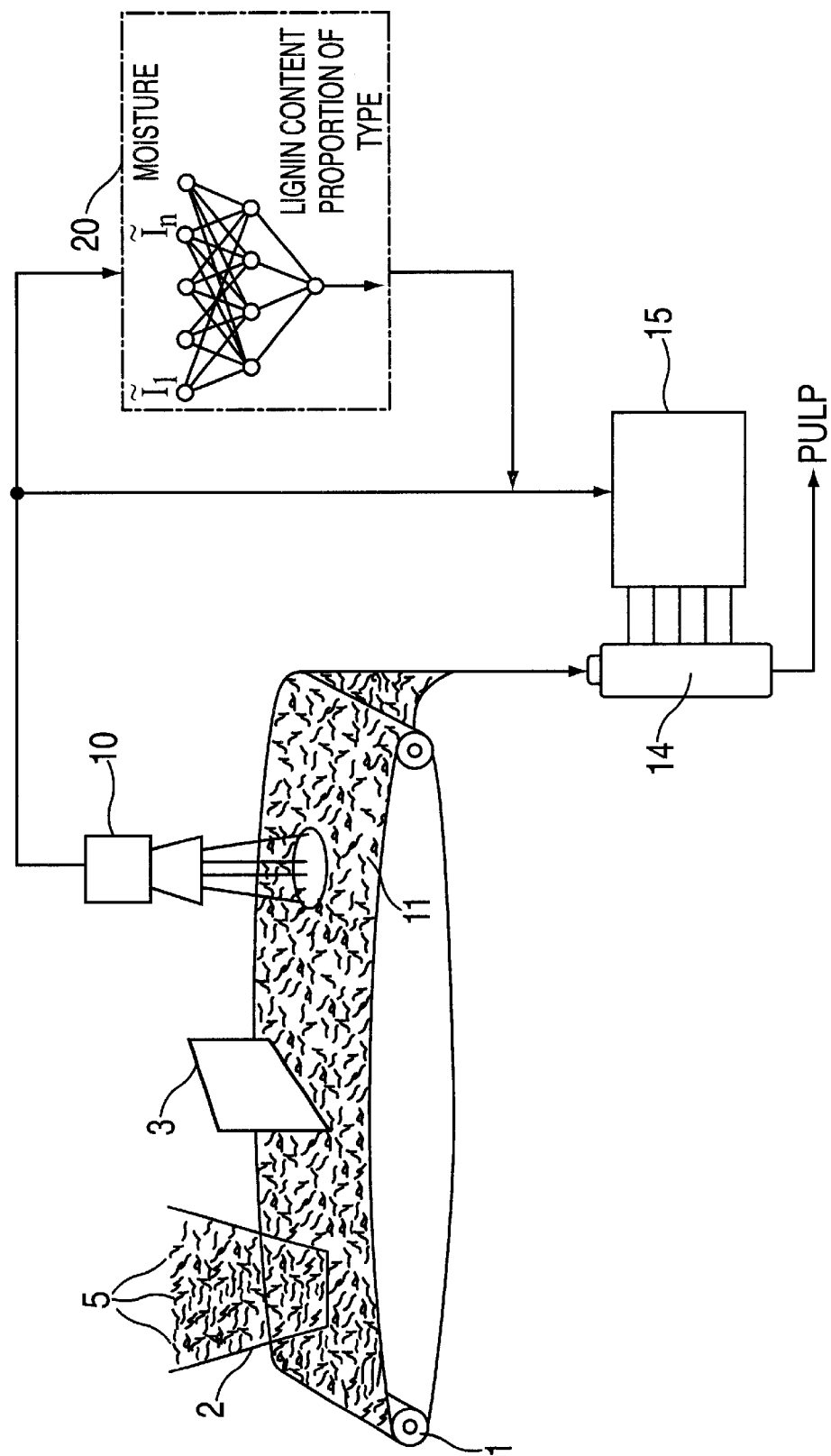
FIG. 1 schematically illustrates one example of a system for registering the suitability of chips for use as the starting raw material in the chemical digestion for the manufacture of pulp.
Figure 3:
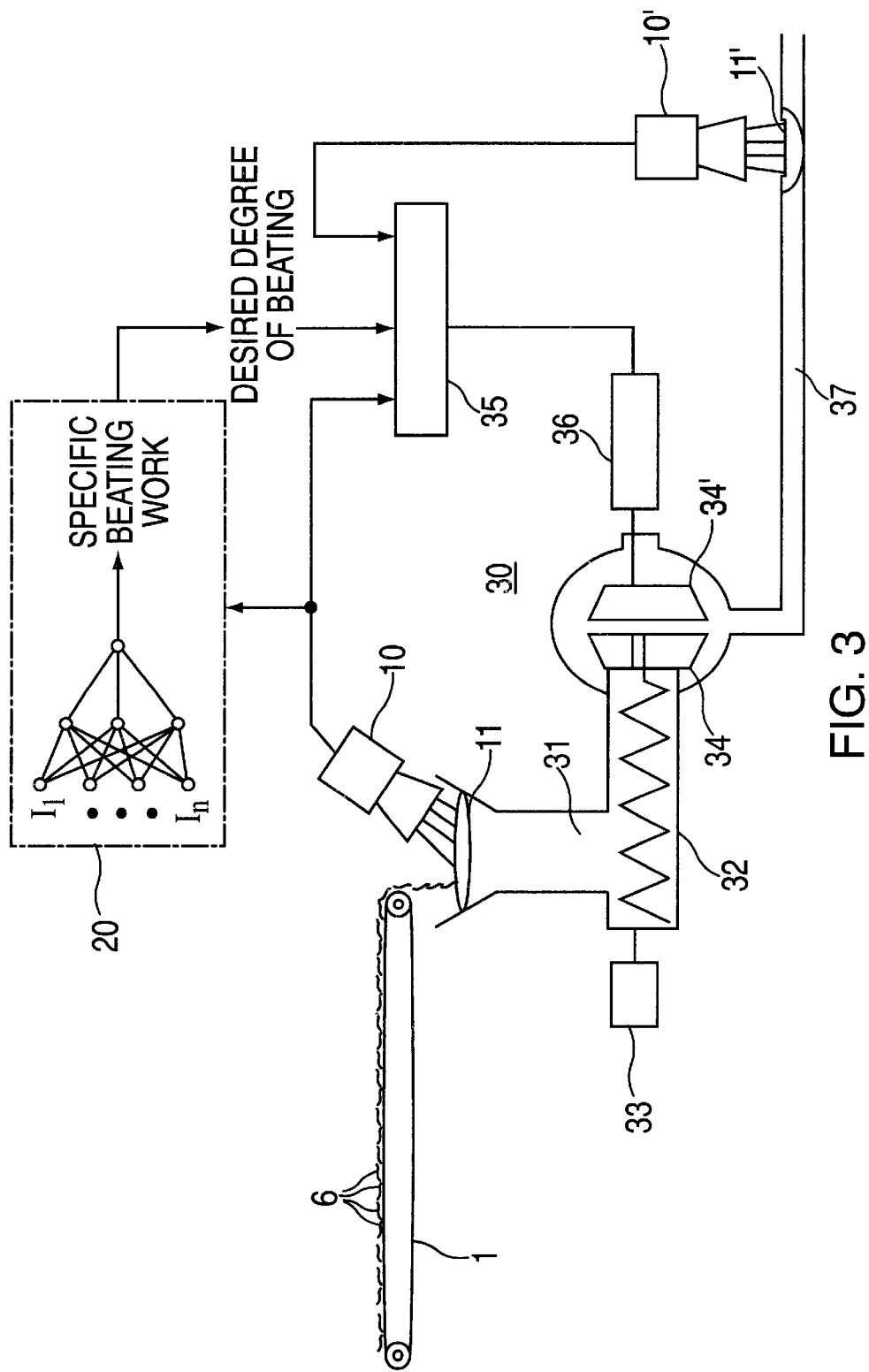
FIG. 3 schematically illustrate a further example, in which chips are assessed for use in a so-called refiner.
Figure 4:
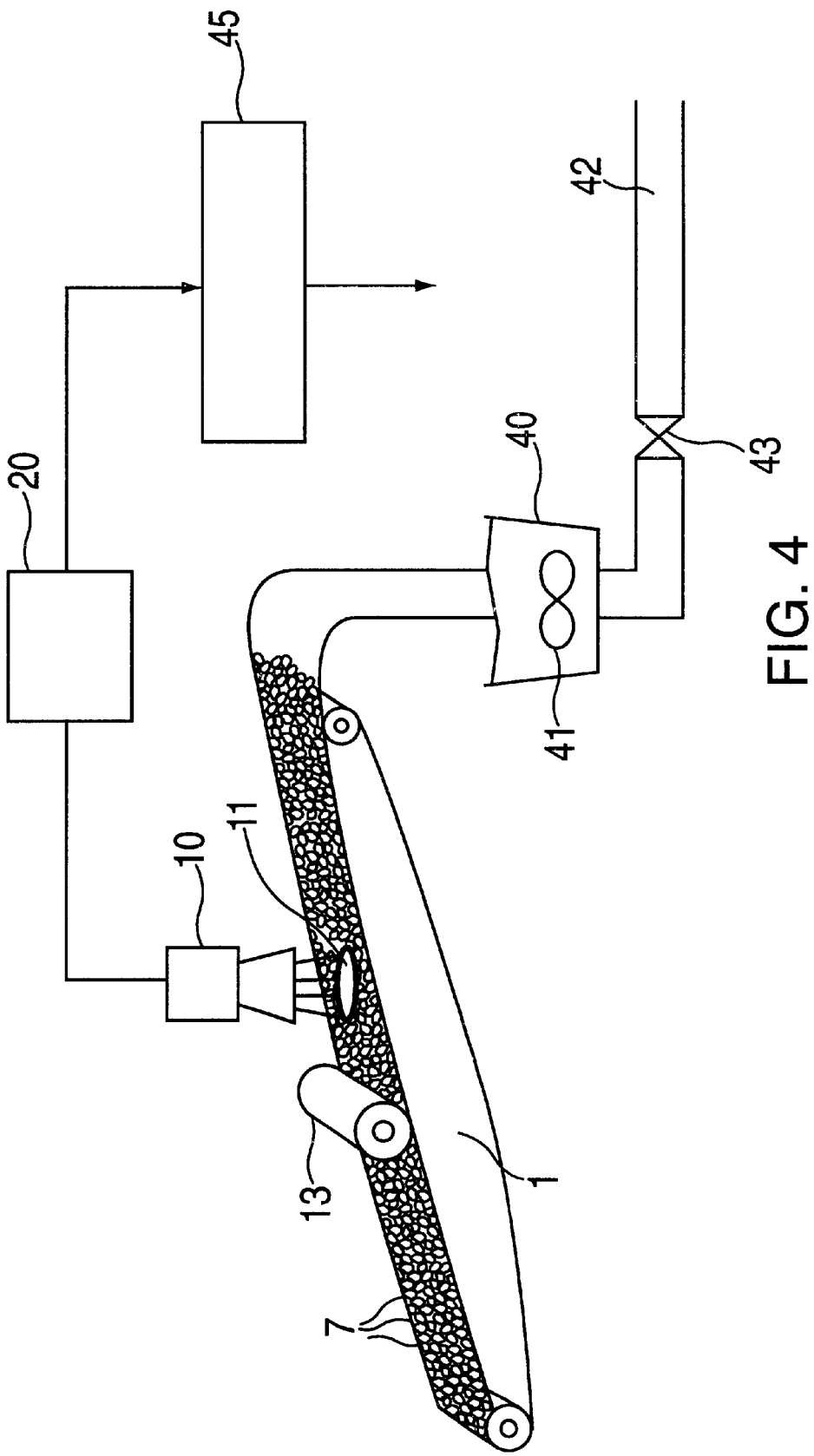
FIG. 4 schematically illustrates a further example, in which waste paper is assessed.

In FIGS. 1, 3 and 4 there is a conveyor belt 1 for the transport of raw materials from a store to a further location for their further processing. With regard to the production of pulp according to FIG. 1, this material consists of chips 5. With regard to the example for the production of paper according to FIG. 4, this material is waste paper 15. In each example, the raw materials are fed via the conveyor belt 1 to specific preparation installations which are only indicated in FIGS. 1, 3 and 4. Fitted above the conveyor belt 1 is a spectroscope or spectrometer 10, with which a measuring area 11 on the conveyor belt 1 is registered. Upstream of the location of the analysis area 11, the stream of raw material is made uniform in terms of height and is leveled, by means of a doctor 3 (in the case of chips 5) or by means of a pressure roller 13 (in the case of waste paper 7), in order that reproducible measured values can be registered.

As shown in FIG. 1, after measurement, the chips 5 pass from the conveyor belt 1 into a digester 14 as processing unit, which is allocated a digester model 15 for process control. The digester model 15 is driven by the signals of the spectrometer 10 with the interposition of an evaluation unit 20, which is described in detail with reference to FIG. 2a. From the digester 14, the finished product pulp passes for further processing into relevant production installations, for example, a paper machine for the production of paper and/or board.

Figure 2B:
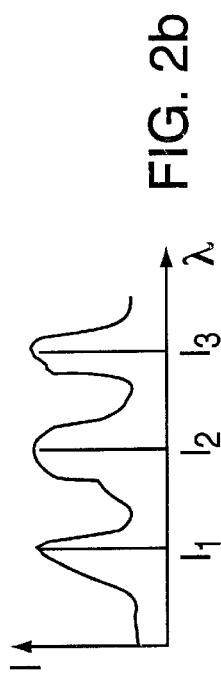
FIG. 2b schematically illustrates the backscatter intensities $I_i$ for preferred wavelengths $\lambda_i$.
Figure 2A:
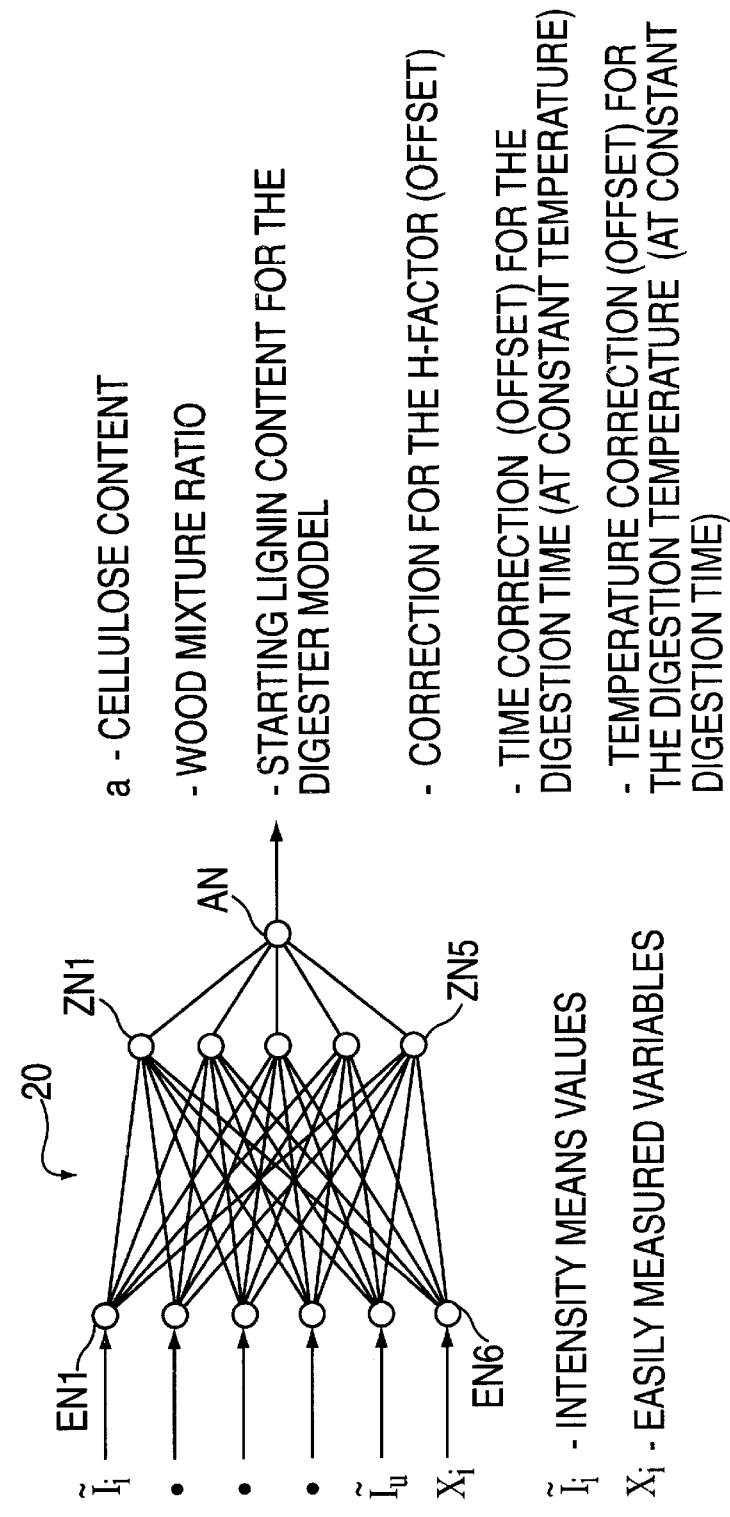
FIG. 2a schematically further illustrates the evaluation device employed in FIG. 1.

In FIG. 2a, the evaluation unit of FIG. 1 is represented as a three-layer neural network which, by way of example, comprises input neurons EN1 to EN6, further neurons ZN1 to ZN5 and an output neuron AN. Using the neural network 20, the spectrum from the spectrometer 10 is evaluated. The backscatter intensities $I_i$ with i=1 . . . , n from preferred wavelengths $\lambda_i$ of the schematic representation according to FIG. 2b. are used as inputs for the neural network 20.

In addition to the wavelengths $I_i$ to $I_n$, further relatively simple to measure raw material properties—such as the moisture and the density or bulk density—can advantageously be used as additional input variables for the neural network 20.

Important raw material properties which are needed for the process control of the preparation process, such as in particular the proportion of various types of wood, and which include, for example, a-cellulose content, wood mixture ratio, starting lignin content for the digester model, correction for the H-factor (offset), time correction (offset) for the digestion time (at constant temperature), and temperature correction (offset) for the digestion temperature (at constant digestion time), can be obtained at the output AN of the neural network 20. For example, in the case of using Eucalyptus on the one hand and Spruce on the other hand as raw materials, the Eucalyptus/Spruce mixture for the sulphate digestion can be determined. On the basis of the mixture ratio, the starting lignin concentration is calculated therefrom, which is an important variable for the control of the digestion process. The lignin concentration CL is given as:

$$CL_{total}=x*CL_{Eucalyptus}+(1-x)*CL_{Spruce}$$

In case of the same wood species, the method specified can also be used for determining the starting lignin content of the raw wood used. The value determined is a measure for the pulp digestion, that is, a statement as to whether the wood may be digested easily or with difficulty.

From the measured values it is, moreover, possible to estimate the cellulose content of the wood, in particular in the case of Eucalyptus Globulus. In addition, it is advantageous to determine a model correction for the digester model 15 according to FIG. 1, using the spectrum via the neural network. If, for example, the known H-factor model is used for the control of the sulphate pulp, the wood quality can be taken into account by means of an offset to the H-factor. Hence, the quality of the pulp produced can be made uniform.

In addition to the variables specified, using the evaluation scheme according to FIG. 2a, it is also possible to make, for example, a time correction or an offset for the digestion time at a prescribed constant temperature or, alternatively, a temperature correction or a relevant offset for the digestion temperature at constant digestion time.

Both correction variables are advantageously usable for determining the digester model 15 according to FIG. 1.

Specifically in FIG. 3, chips 5 are delivered from a conveyor belt 1 into a so-called refiner arrangement 30. The latter comprises a funnel 31, a subsequent screw 32, driven via a motor 33, the beating discs 34 and 34', which are likewise driven by a motor 36, and an associated exit duct 37. The refiner 30 is assigned a control unit 35.

Similar to the embodiment shown in FIG. 1, in FIG. 3 there is a first spectrometer 10 which, as an alternative to being arranged above the conveyor belt 1, is directed directly onto the entry funnel 31 of the refiner 30 and thus covers the funnel 31 as the measuring area 11. The neural network 20 connected downstream of the spectrometer 10, taking into account the spectral lines $I_t$ to $I_n$ and further parameters, determines the specific beating work which, together with the desired degree of beating, form the input variables for the controller 35.

In the arrangement according to FIG. 3, a further spectrometer 10' is assigned to the exit duct 37 for the beaten product. A neural network 20, similar to that shown in FIG. 2a and not shown in detail here, is assigned to the spectrometer 10'. With this arrangement, the quality of the output product can be taken into account and fed back to the control unit 35 as an influencing variable.

Conventional refiners have a high power demand. By means of defibring, matched to the problem, in the refiner 30 according to FIG. 3, it is possible to determine in advance the required specific beating work, which depends strongly on the quality of the wood, and thus to minimize it. This helps save power and provide beaten fibers of uniform quality.

In FIG. 4, waste paper 15 is specifically supplied on the conveyor belt 1, and is panned into a so-called pulper 40 with rotary agitator 41 or into a pulper drum (not shown) for waste paper preparation. Connected to the pulper 40 is a stock preparation means, not shown in detail, to which there runs an outlet channel 42 provided with a valve 43.

Similar to the embodiment shown in FIG. 1, FIG. 4 shows a spectrometer 10 arranged above the conveyor belt 1 with a measuring area 11 on the waste paper 7. The waste paper 7 is made uniform by means of the pressure roller 13, and is now directly registered as raw material by the spectrometer. Corresponding to FIG. 3, connected downstream of the spectrometer 10 is a neural network 20 whose output signal is passed to a control unit 45 with which the preparation installation is controlled. By means of switching in a neural network, the changing quality of the waste paper introduced into the production process can be taken into account directly in the preparation of different waste papers. The latter is carried out essentially in accordance with the method which was previously described in detail in the earlier Patent Application cited above.

Figure 5:
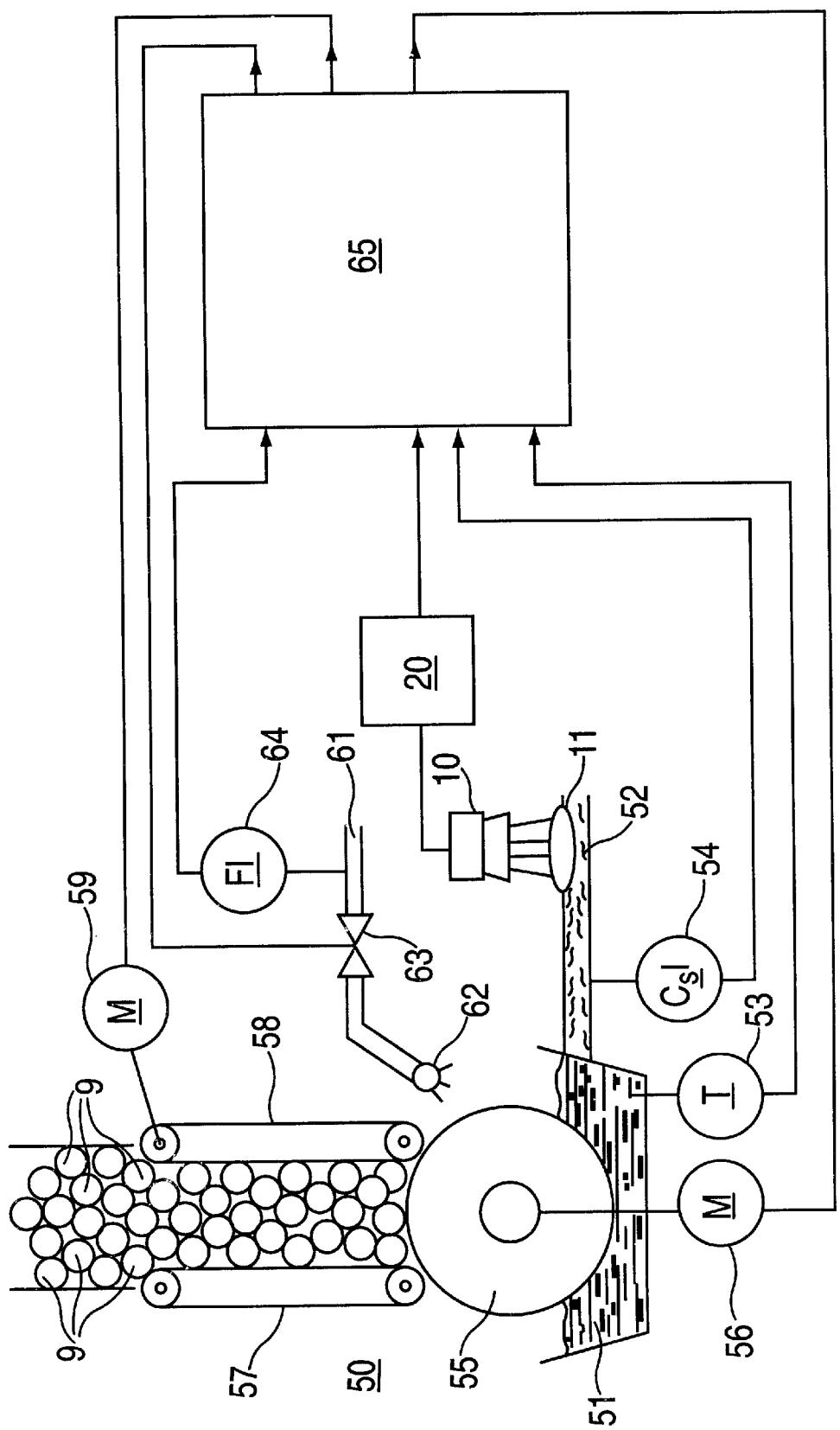
FIG. 5 schematically illustrates an example in which so-called groundwood is assessed.

In FIG. 5, logs 9 pass as raw material into a groundwood installation 50, which essentially comprises a trough 51, filled with water, with a rotating grinding roll 55 and conveyor belts 57 and 58 equipped with doctors. Spray water from a line 61 is delivered onto the grinding roll 55 via at least one spray nozzle 62 with valve 63.

The grinding roll 55 and the conveyor belts 57 and 58 are driven via separate motors 56 and 59, which can be controlled by a control unit 65 using a grinder model with respect to their rates of rotation, which have a decisive influence on the ground product. Furthermore, the amount of the spray water can be varied via the valve 63.

The trough 51 has an outlet channel 52, whose overflow level can be adjustable. In the trough 51, the water temperature T is measured with a sensor 53. In the outlet channel 52 the consistency of the water/groundwood mixture being discharged is measured with a sensor 54. These temperatures are passed into the device 65. Furthermore, the throughput of spray water is normally registered with a measuring device 64.

The spectrometer 10 having the measuring area 11 located in the outlet plane of the outlet channel 52, measures the groundwood in the outlet channel 52. The measured signal, following evaluation in a neural network corresponding to FIG. 2a, is fed to the grinder model of the device 65, for example, for the purpose of so-called regulation of the degree of beating.

Beyond the description of the individual examples, it is noted that, in a continuous production process in the production of pulp and paper, including the preparation of waste paper, at least one spectrometer or, if appropriate, several spectrometers may be arranged at suitable locations in the production process. Using corresponding signal evaluation, statements about the quality of the intermediate product and/or final product to be expected may be derived. As a result of the combination of the individual statements, correction variables can be introduced at various locations into the regulation process, as a result of which overall an improvement in quality is achieved.

What is claimed is:

1. A method for process management in the production of pulp and/or paper, the method comprising the steps of:
   registering the spectral characteristic values from at least starting materials in the production of pulp and/or paper, the starting materials being either one of a primary raw material wood or a secondary raw material waste paper;
   evaluating with a neural network the spectral characteristic values from at least the starting material and deriving statements about the product quality of the starting materials including determining an age of the raw material wood;
   deriving controlled variables for an operating temperature of a pulp digester based on the age of the raw material wood;
   continuously conveying the starting materials passed the measuring device for registering the spectral characteristic values of the starting materials; and
   deriving from the spectral characteristic values control variables for operating at least one operating means used in the production of pulp and/or paper and statements about the product quality of the starting materials.

2. The method according to claim 1, wherein the primary raw material wood is wood chips intended for defibring and/or a beaten product produced therefrom.

3. The method according to claim 2, further comprising the steps of:
   deriving mechanical properties of the wood chips from the spectral characteristic values; and
   deriving the controlled variables for the refiner for defibring the wood chips from the mechanical properties of the wood chips.

4. The method according to claim 3, further comprising the step of:
   deriving correction variables for beating work of the refiner from the mechanical properties of the wood chips.

5. The method according to claim 1, wherein the primary raw material wood is a ground product produced from logs.

6. The method according to claim 5, comprising the steps of:
   determining mechanical properties of the raw material wood from the spectral characteristic values; and
   deriving control variables for the ground product produced from logs from the mechanical properties of the raw material wood to improve the process management in the production of pulp and/or paper.

7. The method according to claim 6, further comprising the step of:
   entering the mechanical properties of the raw material wood into a grinder model to improve the process management in the production of pulp and/or paper.

8. The method according to claim 1, further comprising the steps of:
   determining the lignin content of the raw material wood from the age of the raw material wood and/or a proportion of wood species of the raw material wood; and
   deriving correction variables for the control of the pulp digester from the lignin content.

9. The method according to claim 1, using a pulper for waste paper, further comprising the step of:
   determining specific properties of the waste paper used from the spectral characteristic values; and
   deriving controlled variables for operating the pulper from the specific properties of the waste paper.

10. The method according to claim 1 wherein the secondary raw material waste paper is intended for pulping.

11. A method for process management in the production of a pulp and/or paper, the method comprising the steps of:
    optically scanning starting materials used in the process with a measuring device before which the starting materials continually pass so as to measure their spectra;
    registering the spectra of the starting materials at a plurality of wavelengths;
    passing values corresponding to the spectra from the measuring device to a neural network that produces an output, the neural network adapted to evaluate the spectral characteristic values from at least the spectra of the starting materials received from the measuring device;

deriving statements about the product quality of the starting materials from the spectral characteristic values; and using the output of the neural network to adjust a variable in the management of the process including determining an age of the raw material wood from the spectral characteristic values and deriving variables for controlling at least an operating temperature of a pulp digester from the age of the raw material wood.

12. The method according to claim 11, wherein the starting material consists essentially of wood chips, and the wood chips are subsequently chemically broken down into pulp.

13. The method according to claim 12, wherein the wood chips are passed to a digester to produce pulp, further comprising the steps of determining an age of the wood chips from their spectral characteristic values; and deriving controlled variables for an operating temperature of the pulp digester from the age of the wood chips.

14. The method according to claim 13, further comprising the steps of:

determining the lignin content of the wood chips from the age of the wood chips and the proportion of species of wood employed; and deriving correction variables for the control of the pulp digester from the lignin content.

15. The method according to claim 11, wherein the starting material consists essentially of wood chips, and the wood chips are subsequently subjected to a defibring process.

16. The method according to claim 11, wherein the starting material consists essentially of wood chips that are subsequently used to form a beaten product.

17. The method according to claim 16, further comprising the step of:

using a refiner to beat the wood chips;

deriving correction variables for controlling the beating work of the refiner, said correction variables being derived from the mechanical properties of the wood chips.

18. The method according to claim 11, wherein the starting material is a ground product produced from logs.

19. The method according to claim 11, further comprising the step of deriving statements about the product quality of the starting materials from the spectra.

20. A method for process management in the production of a pulp and/or paper, the method comprising:

optically scanning starting materials used in the process with a measuring device before which the starting materials continually pass to measure the spectra of the starting material;

registering the spectra of the starting materials at a plurality of selected wavelengths;

determining the age of the raw material wood from the spectral characteristic values and deriving variables for controlling at least an operating temperature of a pulp digester from the age of the raw material wood;

passing values corresponding to the selected wavelengths of spectra from the measuring device to a neural network that produces an output, the neural network adapted to evaluate the spectral characteristic values from at least the starting material from the measuring device and derive statements about the product quality of the starting material from the spectral characteristic values;

using the output of the neural network to adjust a variable in the management of the process;

processing the starting materials;

optically scanning the materials so processed with a measuring device to measure their spectra;

passing values corresponding to the spectra from the measuring device to a second neural network that produces an output; and using the output of the second neural network to adjust a variable in the management of the process.

21. A system for controlling the production of pulp or paper from a quantity of starting materials, comprising:

at least one measuring device for detecting the characteristic spectral values of the starting material as they are fed through the system, the starting material being one of wood and a material derived from wood;

a neural network coupled to the measuring device, the neural network adapted to evaluate the spectral characteristic values from at least the starting materials to derive a plurality of statements about the product quality of the starting material from the spectral characteristic values, the neural network further adapted to determine an age of the raw material wood from the spectral characteristic values and derive a controlled variable for operating temperature of a pulp digester from the age of the raw material; and at least one controlling unit in communication with the measuring device, for controlling at least part of a process for treating the starting material; wherein the measuring device is a spectrometer for registering intensity measured values ($I_1$ to $I_n$) at different wavelengths ($\lambda_i$ with I=1, ... ,n), from which correction signals for guiding the controlling unit can be derived through suitable evaluation.

22. The system according to claim 21, wherein the nerural network is further adapted to evaluate the intensity values ($I_1$ to $I_a$).

* * * * *